Dec. 19, 1967     P. C. R. FERNBERG     3,359,029
LOCKING STAY
Filed Nov. 12, 1965     3 Sheets-Sheet 1

INVENTOR
Paul Carl Roger Fernberg
by Philip E. Parker
Attorney.

Dec. 19, 1967 P. C. R. FERNBERG 3,359,029
LOCKING STAY

Filed Nov. 12, 1965 3 Sheets-Sheet 2

INVENTOR
Paul Carl Roger Fernberg
by Philip C. Parker
Attorney.

Dec. 19, 1967   P. C. R. FERNBERG   3,359,029
LOCKING STAY

Filed Nov. 12, 1965   3 Sheets-Sheet 3

INVENTOR
Paul Carl Roger Fernberg.
by Philip E. Parker
Attorney.

United States Patent Office 3,359,029
Patented Dec. 19, 1967

3,359,029
LOCKING STAY
Paul Carl Roger Fernberg, Farnham Common, England, assignor to United-Carr Incorporated, Boston, Mass., a corporation of Delaware
Filed Nov. 12, 1965, Ser. No. 507,436
Claims priority, application Great Britain, Nov. 12, 1964, 46,150/64
6 Claims. (Cl. 292—263)

ABSTRACT OF THE DISCLOSURE

The present invention relates to a locking stay of the type comprising two relatively movable members having two overlying arms each formed with a slot partially overlying and in register with a slot in the other arm and a pawl having a part of its thickness accommodated in one slot, and a part of its thickness accommodated in the other slot, the bounding walls of the slots being so shaped that on successive relative movements of the members alternately in a forward and an opposite reverse direction, the pawl is progressively rotated in the slots into a first position in which further forward movement is prevented, a second position in which further reverse movement is prevented, a third position in which further forward movement is prevented, and a fourth position in which reverse movement beyond the second limited position is allowed. The novel feature of the present invention lies in the provision, in a locking stay of this type of means for preventing the bounding walls from camming the pawl into the third rotated position and thereby preventing reverse movement of the members beyond the second position.

---

Figure 1:
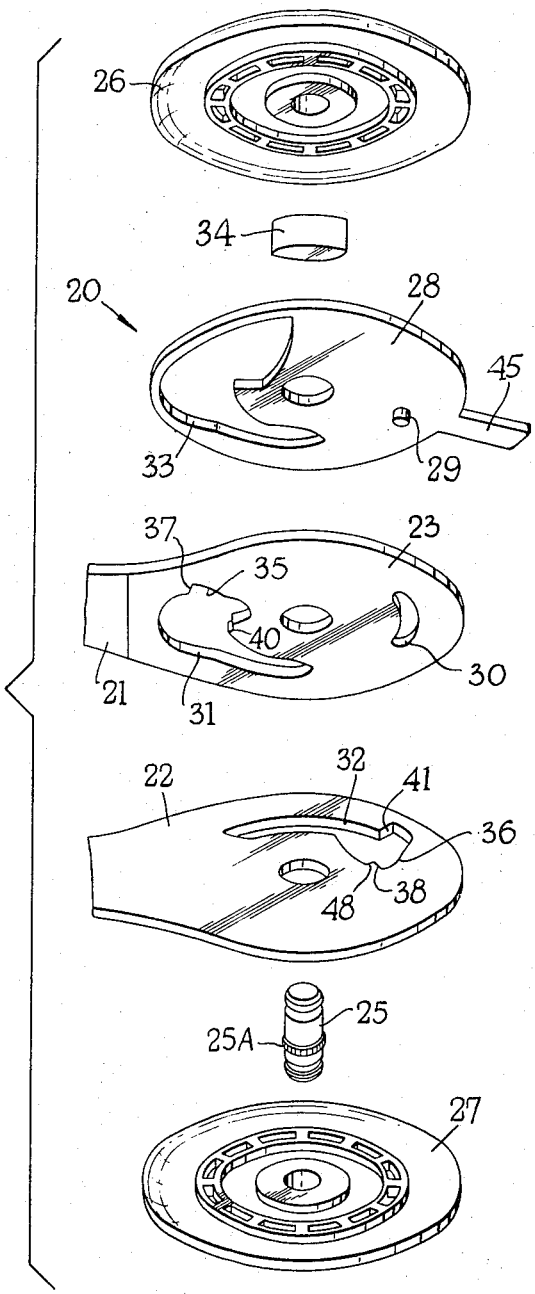

The present invention relates to an improved locking stay of the type which locks itself against closing and which is particularly suitable for use in holding up the bonnet or boot of a motor vehicle or the like.

In our Patent No. 3,141,694 we describe and claim a locking stay comprising a first member and a second member connected together by connecting means which permits, between the members, a defined relative movement in a forward and a reverse direction, each member being formed with a surface overlying a surface of the other member and slidable thereover during said relative movement of the members, and each surface being formed with a slot partially overlying and in register with the slot of the other surface, there being provided, yieldingly constrained to maintain its instantaneous position but otherwise floating, a double-ended pawl having its thickness accommodated partly in one slot and partly in the other slot, the slots being formed with bounding walls so shaped that on successive relative movements of the members alternately in the forward direction and in the reverse direction the pawl is cammed by the walls successively into progressively rotated positions, the pawl being engaged by the walls of the two slots, in a first and a third of said rotated positions, to prevent further relative movement of the members in the forward direction and, in the second of said rotated positions, to prevent further relative movement in the reverse direction, and the pawl, in the fourth of its said rotated positions, being generally aligned with the permitted direction of relative movement and with an extension in that direction of at least one of the slots, said extension permitting movement of the extended slot and of the associated member, relative to the aligned pawl and the other member, in the reverse direction to a relative position of the members which is substantially displaced, in the reverse direction of relative movement, from their relative position as limited, in that direction, by the pawl in its said second rotated position.

If this type of stay is fitted to the bonnet of a vehicle, the bonnet can be lifted to its full extent with one hand and then let go whereupon it closes by a degree or two and then locks against further closing. In order to close the bonnet fully it is first lifted a few degrees and can then be lowered into the closed position.

While the above described stay of Patent No. 3,141,694 has many advantages over other known types of stay it has the disadvantage that it can be accidentally closed, for instance, when it is used on the bonnet of a vehicle and the bonnet, when in the locked open position, is caught by a gust of wind and lifted slightly so as to rotate the pawl into the third rotated position referred to above the bonnet will fall under its own weight. Accidental closing may also occur if the stay mechanism is subjected to unusually strong vibrations or jerks.

It is an object of the present invention to provide a stay mechanism of the type described above which does not have the disadvantage that it can be accidentally closed.

With this object in view, the invention provides in a locking stay of the type comprising two relatively movable members each formed with a surface overlying a surface of the other member, a slot in each surface partially overlying and in register with a slot in the other surface and a pawl having a part of its thickness accommodated in one slot and a part of its thickness accommodated in the other slot and in which the bounding walls of the slots are so shaped that on successive relative movement of the members alternately in a forward and an opposite reverse direction the pawl is progressively rotated in the slots into a first rotated position in which further forward movement is prevented, into a second rotated position in which further reverse movement is prevented into a third rotated position in which further forward movement is prevented and into a fourth position in which reverse movement beyond the second limited position is allowed, means for preventing the bounding walls of the slots from camming the pawl into the third rotated position and thereby preventing reverse movement of the members beyond the second limiting position.

In accordance with a further aspect of the invention there is also provided a locking stay comprising two relatively movable members each formed with a surface overlying a surface of the other member, a slot in each surface partially overlying and in register with a slot in the other surface and a double ended pawl constrained to normally maintain its orientation relative to the slots and having a part of its thickness accommodated in one slot and a part of its thickness accommodated in the other slot, in which the bounding walls of the slots are so shaped that on successive relative movement of the members alternately in a forward and an opposite reverse direction the pawl is progressively rotated in the slots into a first rotated position in which further forward movement is prevented, into a second rotated position in which further reverse movement is prevented, into a third rotated position in which further forward movement is prevented and into a fourth position in which reverse movement beyond the second position is allowed, and a catch plate having a surface adjacent one of the two members and a slot in the said surface, the slot in the said one member extending through the said member and the pawl extending into the slot in the catch plate, the catch plate being keyed to move with one or other of the two members when the members are moved relatively forwardly to rotate the pawl from the first to the second rotated position and the slot in the catch plate being formed with bounding walls such that when the pawl is in the second rotated position and the members are then moved in a forward direction the pawl is cammed by a bounding wall of the slot in the catch plate into a locked position in which further forward movement of the members and further rotation of the pawl is prevented and successive forward and reverse movement of the members results in limited movement only with the pawl moving between the second rotated position and the locked position, the catch plate being manually movable relative to the members way from the position in which it causes the said camming of the pawl, reverse movement of the members from the locked position thereafter causing rotation of the pawl into the said third rotated position.

Figure 2:
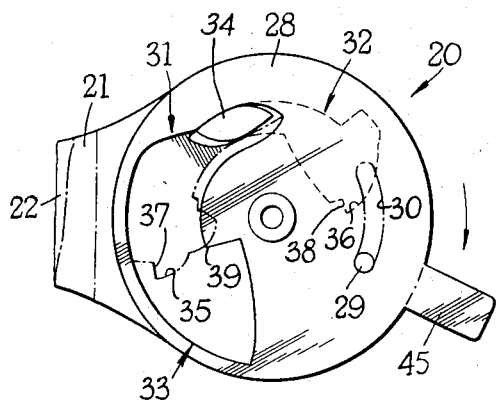
Figure 3:
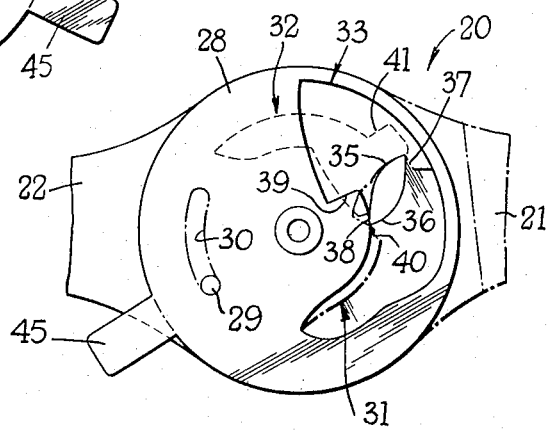
Figure 4:
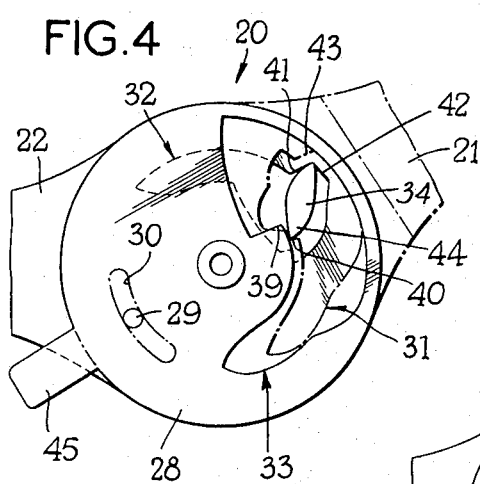
Figure 5:
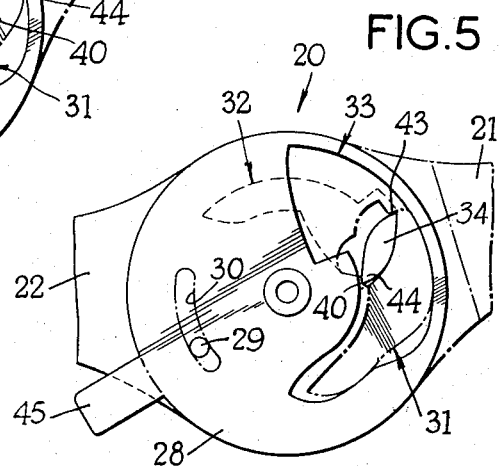
Figure 6:
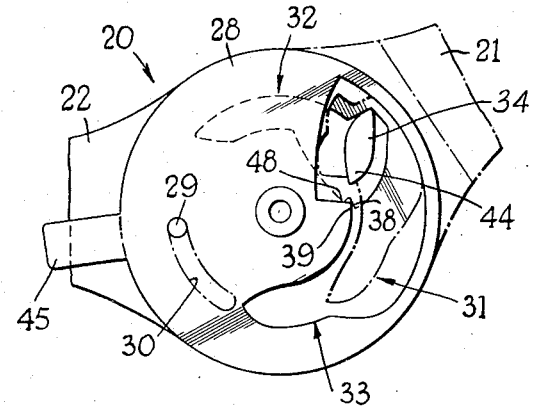
Figure 7:
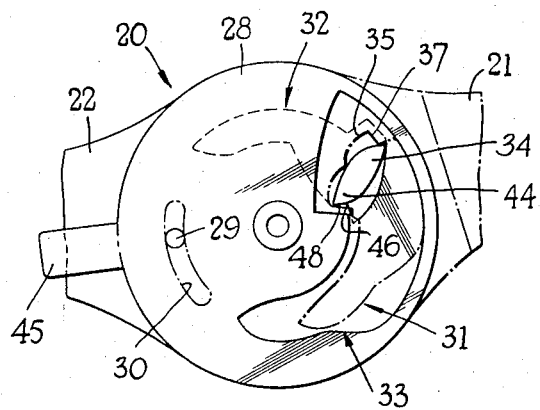
Figure 8:
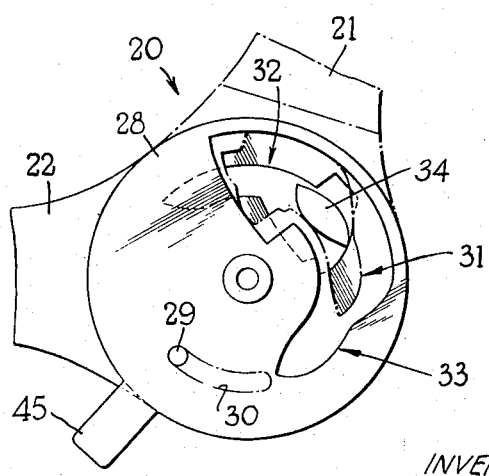

Preferred forms of the invention will now be described with reference to the accompanying diagrammatic drawings in which:

FIGURE 1 is an exploded view of a locking stay,

FIGURE 2 is an elevation of the stay of FIGURE 1 in the closed position with a part removed, FIGURE 3 is an elevation showing the stay in the fully open first rotated position, FIGURE 4 is an elevation showing the stay in the partially closed, second rotated position, FIGURE 5 is an elevation showing the stay in a locked open position, FIGURE 6 is an elevation similar to FIGURE 4, but with the catch plate released, FIGURE 7 is an elevation showing the stay in the fully open, third rotated position, and FIGURE 8 is an elevation showing the stay in a partially closed fourth rotated position.

In FIGURE 1 a locking stay is indicated generally at 20.

The locking stay 20 comprises two relatively rotatable arms 21 and 22 each formed at one end with a flat generally circular plate 23 and 24 respectively. The plates 23 and 24 have their adjacent surfaces in sliding engagement and they are held together by a pivot pin 25, which passes through the centre of the two plates, and two resilient caps 26 and 27 which are non-rotatably attached to the ends of the pivot pin.

The pivot pin 25 has a knurled portion 25a which engages the rim of the central aperture in the plate 24 and thus the plate 23 and the arm 21 are rotatable about the pin 25 relative to the arm 22, the pin 25 and the resilient caps 26 and 27.

A generally circular catch plate 28 is interposed in sliding engagement between the plate 23 and cap 26. The catch plate 28 is free to rotate about the pin 25, and thus relative to the rotatable plate 23, within limits imposed by a pin 29 on the catch plate, which is engaged in an arcuate slot 30 in the plate 23. The pressure of the resilient cap 26 on the catch plate 28 is such that during relative movement between the plates 23 and 24 the catch plate will move with the resilient cap 26 and plate 24 until the pin 29 butts against one or other end of the slot 30. When this occurs the catch plate 28 is rotated with the plate 23 relative to the cap 26 and plate 24.

The plates 23 and 24 are formed with shaped slots 31 and 32 respectively and the catch plate 28 is formed with a shaped slot 33. The slots 31, 32 and 33 are arranged to overlie and a substantially lanceolate-shaped pawl 34 is located between the caps 26 and 27 so as to extend through the depth of the three shaped slots.

The slots 31 and 32 are similar to the slots 16 and 17 in the arms 11 and 12 of the locking stay described in the specification of our Patent No. 3,141,694 and reference should be made to that specification for a detailed description of their function.

Briefly, the shaping of the slots is such that when the arms are successively opened and partially closed the edges of the slots provide a camming effect which rotates the pawl from a position in which relative rotation of the arms from the open to the closed position is first prevented and then permitted. Thus, if the arms are fully opened and then reversely rotated, after the first few degrees of relative angular movement further reverses rotation is prevented. If the arms are again fully opened and then reversely rotated, reverse movement is permitted and the arms can be pivoted into the fully closed position.

The purpose of the catch plate 28 is to provide manually releasable means which prevent rotation of the pawl, when the arms are reversely rotated for a second, or any successive number of times, from the fully open into the partially closed position thereby permanently locking the arms in the open position.

The operation of the locking stay 20 will now be described with reference to FIGURES 2 to 8.

In FIGURE 2 the locking stay is shown with the arms 21, 22 in the closed position. As the arm 21 is pivoted clockwise relative to the arm 22 so as to open the stay, the pawl 34, held frictionally by the caps 26 and 27, remains stationary relative to the arm 22 until its trailing end is engaged by a portion 35 of the wall of the slot 31. The pawl is then carried clockwise with the arm 21 until its other end engages the wall portion 36 of the slot 32; and when this occurs the wall portions 35 and 36, acting obliquely on opposite ends of the pawl, cam those ends in opposite directions and rotate the pawl clockwise into a first rotated position in which further clockwise rotation of the pawl is prevented by abutment of the ends of the pawl against stops constituted by wall portions 37 and 38 of the respective slots. In this first rotated position, with its opposite ends engaged (as shown in FIGURE 3) in two corners of the slots 31 and 32 formed by the wall portions 35 and 37, and 36 and 38 respectively, the pawl 34 prevents further clockwise pivotal movement of the arm 21 relative to the arm 22.

As the arm 21 is rotated from the position of FIGURE 2 to the position of FIGURE 3 it picks up and carries with it the catch plate 28 and in the position of FIGURE 3 an abutment 39 formed in the edge of the slot 33 in the catch plate overlies the edge 38 of the slot 32.

If the arm 21 is now pivoted in the reverse direction i.e. anticlockwise, relative to the arm 22, the frictionally-engaged pawl 34 remains stationary relative to the arm 22 until its forward end is engaged in a notch 40 of the slot 31. When this occurs, the other end of the pawl has already been disengaged by the wall portions 36 and 38 of the slot 32. On continued anticlockwise pivotal movement of the arm 21, the engagement of the pawl by the notch 40 carries the pawl bodily anticlockwise also, and, due to the frictional restraint on the pawl, tends to rotate it still further clockwise. This tendency of the frictional restraint to rotate the pawl may itself be fully effective to rotate the pawl into a second rotated position; but to the extent that the frictional restraint is not itself sufficient, engagement of the free end of the pawl (as it is moved bodily anticlockwise) with a wall portion 41 of the slot 32, and the camming action of the wall portion 41 on the free end of the pawl as the other end thereof continues to be acted on by the notch 40 of the slot 31, is effective to rotate the pawl into the said second rotated position (shown in FIGURE 4) in which the pawl prevents further anticlockwise pivotal movement of the arm 21 relative to the arm 22 by engagement of its one end in the notch 40 of the slot 31 and by engagement of its other end in a corner of the slot 32 formed by the wall portion 41 and an adjacent wall portion 42.

When the arm 21 is rotated from the position of FIGURE 3 to the position of FIGURE 4 the catch plate 28 is frictionally held by the resilient cap 26 and does not move with the plate 23. Thus, the abutment 39 remains in the same position relative to the slot 32 in the plate 22.

If the arm 21 is now rotated forwardly into the fully open position for a second time, the pawl 34 remains stationary, held between the caps 26, 27 until it is engaged by the wall portion 43 of the slot 31 and is moved thereby into the position shown in FIGURE 5. During rotation of the arm 21 from the position of FIGURE 4 to the position of FIGURE 5 the catch plate remains stationary and the radially inner end 44 of the pawl rides along the curved edge portion of the abutment 39.

If the arm 21 is now rotated in the reverse direction the pawl and the catch plate remain stationary until the notch 40 of the slot 31 engages the radially inner end 44 of the pawl and carries it back into the position shown in FIGURE 4, in which further reverse movement of the arm 21 is prevented. Further reverse and forward movement of the arm 21 can now only take place between the limiting positions of FIGURES 4 and 5 so long as the catch plate 28 remains in the locked position.

If the catch plate 28 is now manually rotated, relative to the plate 23 by means of a finger tab 45, into the position shown in FIGURE 6, in which the abutment 39 is angularly displaced in the forward direction from the corner formed by the wall portion 38 and an adjacent wall portion 48 of the slot 32, and the arm 21 is again fully opened, the end 44 of the pawl rides along the wall portion 48 of the slot 32 and the pawl 34 is rotated into the position shown in FIGURE 7. If the arm 21 is now reversely rotated the pawl is rotated further, in the same angular direction by an edge portion 46 of the slot 31 so as to be aligned with the slots 31, 32 as shown in FIGURE 8. The arm 21 can then be fully closed again.

It will be seen that the catch plate 28 is keyed to the plate 23 in such a manner that the catch plate is always carried with the plate 23 into the fully open position with the abutment 39 on the catch plate overlying the corner of the slot 32 formed by the wall portion 38, 48. Thus, the arm 21 is normally locked against closing and is only released by manual rotation of the catch plate 28 in the forward direction into the release position shown in FIGURE 6.

In an alternative embodiment of the invention the catch plate is located adjacent the plate 24 and is not keyed to the plate 23 but moves as before under friction with the plate 24. The catch plate 28 is manually rotated, relative to the plate 24 both in the forward and reverse directions within limits imposed by a slot in the plate 24 and a stop in the catch plate, and thus the catch plate is moved manually both into and out of the locked position.

In yet a further embodiment of the invention the catch plate is keyed to the plate 23 in such a way that the catch plate is always carried with the plate 23 into the fully open position with the abutment 39 located forwardly, that is forwardly with respect to the opening direction, of the wall portion 48 in the slot 32 and is moved manually in the reverse direction to overlie the wall portion 48 and lock the arm 21 against closing. Thus in this embodiment also the catch plate is moved manually both into and out of the locked position.

In our Patent No. 3,141,694 there is described and claimed a locking stay incorporating a linear action and it will be appreciated that a catch plate designed on the principles outlined in the present specification could be embodied in such a linearly acting locking stay.

What I claim is:

1. In a locking stay of the type comprising two relatively movable members each formed with a surface overlying a surface of the other member, a slot in each surface partially overlying and in register with a slot in the other surface and a pawl having a part of its thickness accommodated in one slot and a part of its thickness accommodated in the other slot and in which the bounding walls of the slots are so shaped that on successive relative movement of the members alternately in a forward and an opposite reverse direction the pawl is progressively rotated in the slots into a first rotated position in which further forward movement is prevented, into a second rotated position in which further reverse movement is prevented, into a third rotated position in which further forward movement is prevented and into a fourth position in which reverse movement beyond the second limited position is allowed, a catch plate in superposed proximate relation to one of said movable members and having a slot with abutment means projecting therein for preventing the bounding walls of the slots from camming the pawl into the third rotated position and thereby preventing reverse movement of the members beyond the second limiting position.

2. A locking stay as claimed in claim 1 in which the catch plate is manually movable from the locked to an unlocked position.

3. A locking stay comprising two relatively movable members each formed with a surface overlying a surface of the other member, a slot in each surface partially overlying and in register with a slot in the other surface and a double ended pawl constrained to normally maintain its orientation relative to the slots and having a part of its thickness accommodated in one slot and a part of its thickness accommodated in the other slot and in which the bounding walls of the slots are so shaped that on successive relative movement of the members alternately in a forward and an opposite reverse direction the pawl is progressively rotated in the slots into a first rotated position in which further forward movement is prevented, into a second rotated position in which further reverse movement is prevented, into a third rotated position in which further forward movement is prevented and into a fourth position in which reverse movement beyond the second position is allowed, and a catch plate having a surface adjacent one of the two members and a slot in the said surface, the slot in the said one member extending through the said member and the pawl extending into the slot in the catch plate, the catch plate being keyed to move with one or other of the two members when the members are moved relatively forwardly to rotate the pawl from the first to the second rotated position and the slot in the catch plate being formed with bounding walls such that when the pawl is in the second rotated position and the members are then moved in a forward direction the pawl is cammed by a bounding wall of the slot in the catch plate into a locked position in which further forward movement of the members and further rotation of the pawl is prevented and successive forward and reverse movement of the members results in limited movement only with the pawl moving between the second rotated position and the locked position, the catch plate being manually movable relative to the members away from the position in which it causes the said camming of the pawl, reverse movement of the members from the locked position thereafter causing rotation of the pawl into the said third rotated position.

4. A locking stay as claimed in claim 3 in which the catch plate is keyed to one of the members by a pin integral with or fixed to the catch plate and extending into a slot in the said one member the length and position of the slot being such that the catch plate is carried with the said one member when the pawl is rotated from the first to the second rotated position, movement of the catch plate independently of the one member away from the position in which it causes the said camming of the pawl is allowed and the catch plate is carried with the said one member when the members are moved reversely to rotate the pawl from the locked position through the fourth rotated position.

5. A locking stay as claimed in claim 4, in which the two members and the catch plate comprise flat plates pivoted together for relative rotation with their adjacent surfaces in sliding engagement.

6. A locking stay as claimed in claim 5, in which the slots in the members and in the catch plate extend therethrough.

(References on following page)

References Cited

UNITED STATES PATENTS

| | | | |
|---|---|---|---|
| 2,566,182 | 8/1951 | Flynn | 292—267 |
| 3,141,694 | 7/1964 | Birmingham | 16—139 |
| 3,285,647 | 11/1966 | Birmingham | 292—263 |

FOREIGN PATENTS

| | | |
|---|---|---|
| 4,693 | 1879 | Great Britain. |
| 355,556 | 8/1931 | Great Britain. |
| 594,981 | 11/1947 | Great Britain. |

MARVIN A. CHAMPION, *Primary Examiner.*

EDWARD J. McCARTHY, *Assistant Examiner.*